US012769582B2

(12) United States Patent
Poornachandran

(10) Patent No.: US 12,769,582 B2
(45) Date of Patent: Oct. 20, 2026

(54) APPARATUS, DEVICE, METHOD AND COMPUTER PROGRAM FOR CONTROLLING THE EXECUTION OF A COMPUTER PROGRAM BY A COMPUTER SYSTEM

(71) Applicant: Intel Corporation, Santa Clara, CA (US)

(72) Inventor: Rajesh Poornachandran, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 17/809,300

(22) Filed: Jun. 28, 2022

(65) Prior Publication Data

US 2022/0326991 A1 Oct. 13, 2022

(51) Int. Cl.
*G06F 9/48* (2006.01)
*G06F 9/38* (2018.01)
*G06F 9/54* (2006.01)

(52) U.S. Cl.
CPC .......... *G06F 9/4881* (2013.01); *G06F 9/3836* (2013.01); *G06F 9/545* (2013.01)

(58) Field of Classification Search
None
See application file for complete search history.

(56) References Cited

U.S. PATENT DOCUMENTS

2007/0294512 A1* 12/2007 Crutchfield ............. G06F 8/443 712/E9.033
2008/0313640 A1* 12/2008 Liu ....................... G06F 1/3203 713/320
2016/0232127 A1* 8/2016 Potkonjak ........... H10D 62/822
(Continued)

FOREIGN PATENT DOCUMENTS

CN 1863192 A * 11/2006

OTHER PUBLICATIONS

A. L. Varbanescu and J. Shen, "Heterogeneous computing with accelerators: an overview with examples," 2016 Forum on Specification and Design Languages (FDL), Bremen, Germany (Year: 2016).*

(Continued)

*Primary Examiner* — S. Sough
*Assistant Examiner* — Selena Sabah Nahra
(74) *Attorney, Agent, or Firm* — 2SPL Patent Attorneys PartG mbB; Yong Beom Hwang

(57) ABSTRACT

Examples relate to an apparatus, a device, a method, and a computer program for controlling the execution of a computer program by a computer system comprising two or more different Processing Units (XPUs), and to a corresponding computer system. The apparatus comprises processing circuitry configured to obtain the computer program, wherein at least a portion of the computer program is based on one or more compute kernels to be executed by the two or more different XPUs. The processing circuitry is configured to determine, for each XPU, an energy-related metric (Continued)

for executing the one or more compute kernels on the respective XPU. The processing circuitry is configured to assign the execution of the one or more compute kernels to the two or more different XPUs based on the respective energy-related metric.

20 Claims, 7 Drawing Sheets

(56) References Cited

U.S. PATENT DOCUMENTS

| | | | | |
|---|---|---|---|---|
| 2017/0308411 | A1* | 10/2017 | Brill | G06F 9/5044 |
| 2019/0180028 | A1* | 6/2019 | Seo | G06F 21/602 |
| 2020/0249998 | A1* | 8/2020 | Che | G06N 20/00 |
| 2021/0042140 | A1* | 2/2021 | Paul | G06F 1/3206 |
| 2021/0182390 | A1* | 6/2021 | Winterrowd | G06F 21/56 |
| 2022/0300324 | A1* | 9/2022 | Chang | G06F 9/5088 |
| 2024/0256333 | A1* | 8/2024 | Weber | G06F 9/5044 |

OTHER PUBLICATIONS

R. Kavanagh, K. Djemame, J. Ejarque, R. M. Badia and D. Garcia-Perez, “Energy-Aware Self-Adaptation for Application Execution on Heterogeneous Parallel Architectures,” in IEEE Transactions on Sustainable Computing, vol. 5, No. 1, pp. 81-94 (Year: 2020).*

M. F. Abulkhair, E. S. Alkayal and N. R. Jennings, “Automated Negotiation using Parallel Particle Swarm Optimization for Cloud Computing Applications,” 2017 International Conference on Computer and Applications (ICCA), Doha, Qatar, 2017, pp. 26-35, doi: 10.1109/COMAPP.2017.8079779. (Year: 2017).*

K. Mahbub and G. Spanoudakis, “Proactive SLA Negotiation for Service Based Systems,” 2010 6th World Congress on Services, Miami, FL, USA, 2010, pp. 519-526, doi: 10.1109/SERVICES.2010.15. (Year: 2010).*

* cited by examiner

APPARATUS, DEVICE, METHOD AND COMPUTER PROGRAM FOR CONTROLLING THE EXECUTION OF A COMPUTER PROGRAM BY A COMPUTER SYSTEM

FIELD

Examples relate to an apparatus, a device, a method, and a computer program for controlling the execution of a computer program by a computer system, and to a corresponding computer system.

BACKGROUND

Today, Intel®'s oneAPI based libraries e.g. oneDNN (oneAPI Deep Neural Network), oneMKL (oneAPI Math Kernel Library), MediaSDK (Media Software Development Kit), etc.) as well as libraries from other manufacturers (such as CUDA (Compute Unified Device Architecture), or OpenCL (Open Computation Language), etc.) drive the logic of computational kernels (compute primitives) with primarily performance-driven heuristics that are compatible with a variety of XPU (X Processing Unit, with X denoting a variety of different processing units) hardware, such as FPGAs (Field-Programmable Gate Arrays), GPUs (Graphics Processing Units), CPUs (Central Processing Units), ASICs (Application-Specific Integrated Circuits), etc. In general, power efficiency and thermal efficiency aspects are not factored in, which may lead to outcomes with a reduced performance per watt, and thus a higher total cost of ownership, while being at odds with an industry vision in terms of sustainable computing and reducing a carbon footprint.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
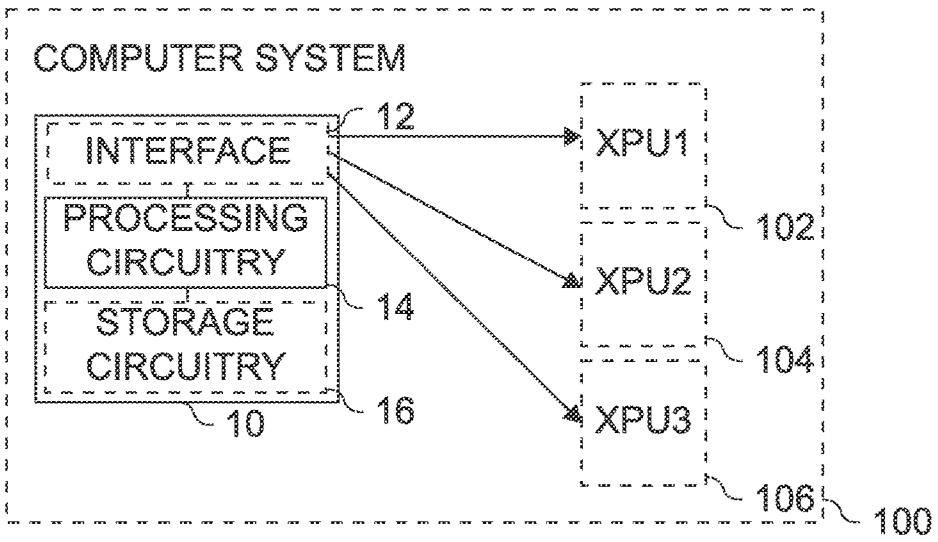
FIGS. 1*a* and 1*b* show a schematic diagram of an example of an apparatus or device for controlling the execution of a computer program by a computer system comprising two or more different processing units.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

Figure 1B:
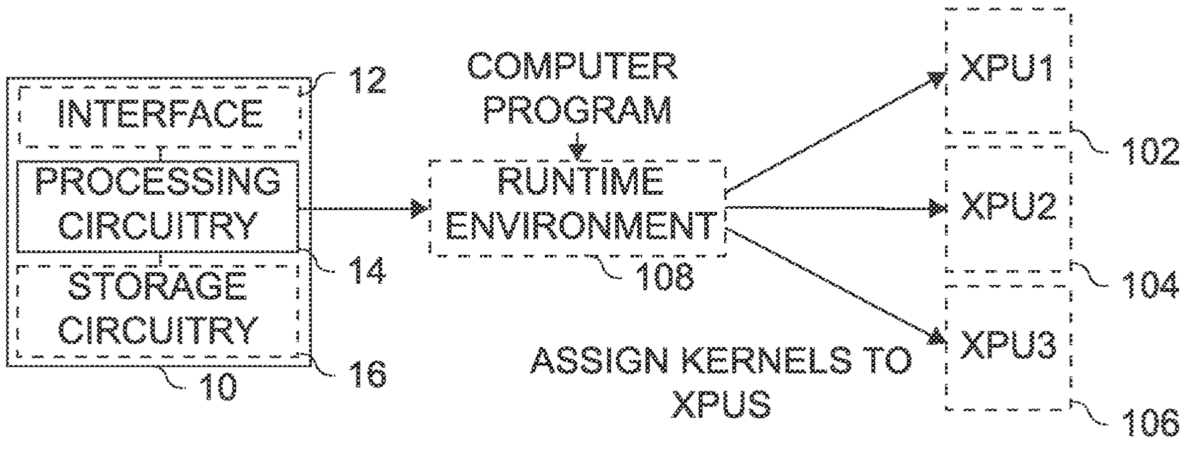

FIGS. 1*a* and 1*b* show a schematic diagram of an example of an apparatus 10 or device 10 for controlling the execution of a computer program by a computer system 100 comprising two or more different Processing Units (XPUs) 102; 104; 106. The apparatus 10 comprises circuitry that is configured to provide the functionality of the apparatus 10. For example, the apparatus 10 of FIG. 1*a* comprises (optional) interface circuitry 12, processing circuitry 14 and (optional) storage circuitry 16. For example, the processing circuitry 14 may be coupled with the interface circuitry 12 and with the storage circuitry 16. For example, the processing circuitry 14 may be configured to provide the functionality of the apparatus, in conjunction with the interface circuitry 12 (for exchanging information, e.g., with other components of the computer system, such as the two or more XPUs 102; 104; 106) and the storage circuitry (for storing information, such as machine-readable instructions) 16. Likewise, the device 10 may comprise means that is/are configured to provide the functionality of the device 10. The components of the device 10 are defined as component means, which may correspond to, or implemented by, the respective structural components of the apparatus 10. For example, the device 10 of FIGS. 1*a* and 1*b* comprises means for processing 14, which may correspond to or be implemented by the processing circuitry 14, (optional) means for communicating 12, which may correspond to or be implemented by the interface circuitry 12, and (optional) means for storing information 16, which may correspond to or be implemented by the storage circuitry 16. In general, the functionality of the processing circuitry 14 or means for processing 14 may be implemented by the processing circuitry 14 or means for processing 14 executing machine-readable instructions. Accordingly, any feature ascribed to the processing circuitry 14 or means for processing 14 may be defined by one or more instructions of a plurality of machine-readable instructions. The apparatus 10 or device 10 may comprise the machine-readable instructions, e.g., within the storage circuitry 16 or means for storing information 16.

The processing circuitry 14 or means for processing 14 is configured to obtain the computer program. At least a portion of the computer program is based on one or more compute kernels to be executed by the two or more different XPUs 102; 104; 106. The processing circuitry 14 or means for processing 14 is configured to determine, for each XPU, an energy-related metric for executing the one or more compute kernels on the respective XPU. The processing circuitry 14 or means for processing 14 is configured to assign the execution of the one or more compute kernels to the two or more different XPUs based on the respective energy-related metric.

FIG. 1*a* further shows a computer system 100 comprising the apparatus 10 or device 10 and the two or more XPUs 102; 104; 106.

Figure 1C:
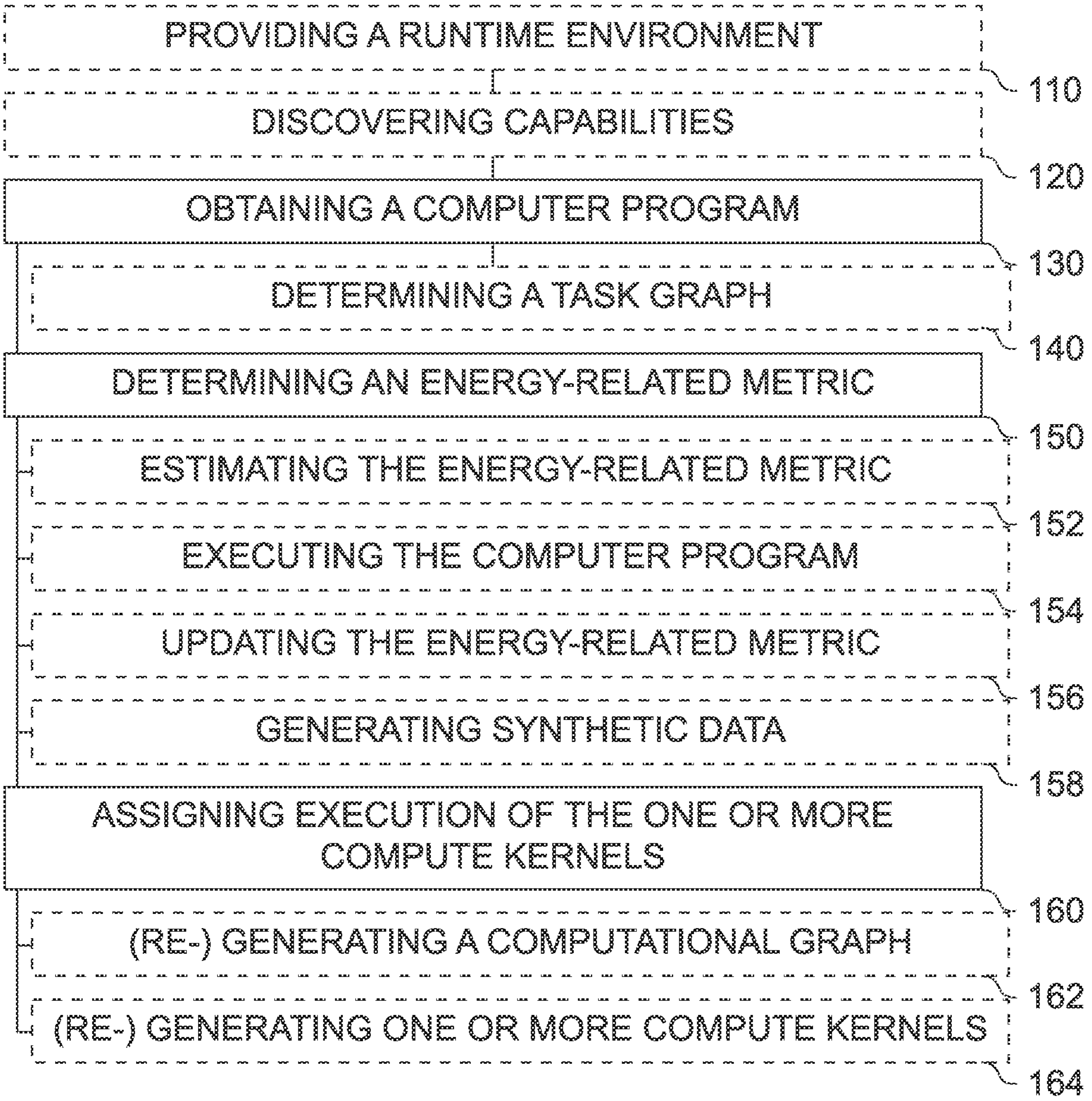
FIG. 1*c* shows a flow chart of a method for controlling the execution of the computer program by the computer system comprising two or more different processing units.

FIG. 1*c* shows a flow chart of a corresponding (computer-implemented) method for controlling the execution of the computer program by the computer system 100 comprising two or more different Processing Units (XPUs) 102; 104; 106. The method comprises obtaining 130 the computer program. The method comprises determining 150, for each XPU, the energy-related metric for executing the one or more compute kernels on the respective XPU. The method comprises assigning 160 the execution of the one or more compute kernels to the two or more different XPUs based on the respective energy-related metric.

In the following, the functionality of the apparatus 10, the device 10, the method and of a corresponding computer program is illustrated with respect to the apparatus 10. Features introduced in connection with the apparatus 10 may likewise be included in the corresponding device 10, method and computer program.

The present disclosure relates to a concept for controlling the execution of a computer program by a computer system 100 comprising multiple different XPUs, and in particular to the assignment of compute kernels to the different XPUs. Some aspects of the present disclosure also relate to a selection of specific computational resources and associated communication/storage paths within an XPU as well. For example, when considering Intel® Xeon® CPUs, Kernels can be generated that can run using SSE/AVX2/AVX3/AMX, depending on how much of energy headroom is available. The present disclosure thus relates to a scenario, where a portion of a computer program benefits from being executed by an XPU. In practice, such a scenario arises with computer programs that use an offloading framework for offloading some part of the computer program to an accelerator card (i.e., an XPU) that is generally more efficient and/or has a higher performance than performing the entire computation with the CPU of the computer system. Such scenarios arise in applications such as the training of machine-learning models, where the CPU is used to execute a portion of the computer program being used to set up the training process (e.g., copy the training samples to memory etc.), and where a powerful XPU (e.g., a GPU or an ASIC) is used to perform the training. Once the training is completed, the clean up operations are again performed by the CPU. Such division of labor is also found in other contexts, e.g., in scientific computation.

In general, such offloading of some portion of the computer program may be managed by a runtime environment, which, regardless of the XPUs being available, provides an abstract and uniform runtime environment for the computer program. The runtime environment thus provides an environment, in which the computer program can be executed, with the runtime environment being responsible for distributing the portion of the computer program being offloaded to an XPU to the respective XPU or XPUs being used. Accordingly, the proposed functionality may be provided as part of a runtime environment. In other words, as shown in FIG. 1*b*, the processing circuitry may be configured to provide a runtime environment 108 for the execution of the computer program. Accordingly, as further shown in FIG. 1*c*, the method may comprise providing 110 the runtime environment for the execution of the computer program. In this context, the runtime environment is an environment for executing the computer program, with the runtime environment being configured to provide access to the XPUs for at least a portion of the computer program. For example, the runtime environment 108 may be configured to control a distribution of the one or more compute kernels to the two or more XPUs (e.g., by copying the compute kernels and associated data to the memory of the respective XPU, and/or by retrieving the results of the computation from the respective XPU. For example, the runtime environment, which may be provided by the processing circuitry, may be configured to communicate with the two or more XPUs using the interface circuitry. In the present case, the runtime environment may be configured to perform the proposed functionality. In particular, the determination of the energy-related metric and the assignment of the execution may be performed by the runtime environment. Other tasks, such as the determination, generation or re-generation of a task graph, a generation or re-generation of compute kernels, and a scheduling of the compute kernels to the two or more XPUs, may also be performed by the runtime environment.

At initialization, the processing circuitry, and more particularly the runtime environment, may perform a discovery process for determining the presence of XPUs, and the capabilities of the XPUs being present (and of memory and/or interconnects being used to communicate with the XPUs). In other words, the processing circuitry may be configured to discover capabilities of the two or more XPUs of the computer system. Accordingly, as further shown in FIG. 1*c*, the method may comprise discovering 120 the capabilities of the two or more XPUs of the computer system. In particular, the capabilities may comprise one or more of a compute capability (e.g., a number of compute units, a supported ISA, power required per instruction or time etc.), a memory capability (e.g., a memory capacity and/or memory speed), and an interconnect capability (e.g., an interconnect throughput) of the respective XPU. In general, the proposed concept is compatible with many different types of XPUs. For example, the two or more XPUs may comprise two or more of the group of a Central Processing Unit (CPU), a Graphics Processing Unit (GPU), a Field-Programmable Gate Array (FPGA), and an Application-Specific Integrated Circuit (ASIC), such as an Artificial Intelligence (AI) accelerator or a communication processing offloading unit. In some examples, the two or more different XPUs may exclude the CPU of the computer system. In other words, the two or more XPUs may comprise two or more of the group of a GPU, an FPGA, an AI accelerator, and a communication processing offloading unit.

The processing circuitry is configured to obtain the computer program, with at least a portion of the computer program being based on one or more compute kernels to be executed by the two or more different XPUs. In the context of the present disclosure, the one or more compute kernels each contain subsets (i.e., groups) of instructions of the computer program, which are to be performed (i.e., executed) by one of the XPUs. In some cases, multiple instances of the same compute kernel may be performed/executed in parallel, e.g., using the same XPU or using different XPUs. In general, the one or more compute kernels are used to offload tasks of the computer program from the CPU of the computer system to another XPU of the computer system.

In various examples of the present disclosure, the computer program may be divisible into different tasks, which may be performed by different XPUs of the computer system. For example, some tasks of the computer program may be performed by the CPU of the computer system, while some tasks, and in particular some tasks being based on parallel processing, may be performed by another XPU, such as a GPU, an FPGA, or an ASIC. These tasks may be represented by a so-called task graph (or computational graph). For example, the processing circuitry may be configured to determine a task graph of the computer program. Accordingly, the method may comprises determining 140 a task graph of the computer program. This task graph represents the tasks (i.e., groups of instructions to be performed by an XPU) being performed, with the tasks being represented by the vertices (i.e., nodes) of the graph and the dependency (and in particular data dependency) between the tasks being represented by the edges of the graph. Some of the tasks may be performed by the aforementioned one or more compute kernels. Accordingly, the one or more compute kernels may be part of the task graph. In general, this task graph may be generated based on a static analysis of the computer program (e.g., by analyzing the code or an intermediate representation of the computer program), which may be a fast if less precise for generating the task graph, or dynamically (e.g., by executing the computer program or portions thereof), which may improve the precision at the cost of additional effort. For example, the processing circuitry may be configured to generate (or re-generate, once the assignment of the execution has been performed) the task graph based on a static analysis of the computer program. Accordingly, as further shown in FIG. 1*c*, the method may comprise generating 140 or re-generating 162 the task graph based on a static analysis of the computer program. Alternatively, or additionally, the processing circuitry may be configured to generate or re-generate the task graph based on a dynamic analysis of the computer program based on a real-world current data flow and/or a real-world past data flow. Accordingly, the method may comprise generating 140 or re-generating 162 the task graph based on a dynamic analysis of the computer program based on the real-world current data flow and/or the real-world past data flow. This dynamic analysis may be performed by executing the computer program (or portions thereof) in a sandboxed environment or using the two or more XPUs with appropriate telemetry.

The proposed concept is centered around the insight, that the same instructions or tasks have different energy and thermal implications when they are performed by different XPUs or same XPU with different instructions. For example, while CPUs are general-purpose devices capable of running diverse portions of codes, they are often less efficient than other XPUs when running highly parallelized code or highly specialized code. For example, while a GPU may have a high energy consumption, and thus also a high thermal impact, it is also highly efficient for parallel processing of large amounts of data. At the same time, specialized tools, such as FPGAs and ASICs are even more efficient, albeit at a limited set of tasks. The proposed concept is based on an energy-related metric that allows the selection of the most power efficient or most thermally efficient XPU for a given task. In this context, the energy-related metric might not be exclusively based on the power consumption or thermal impart on the XPU, but also other hardware, such as storage circuitry and interconnect circuitry or interface circuitry. In other words, the energy-related metric relates to the execution of the XPU by a system, with the execution having an impact on the respective XPU being used, but also on the storage circuitry and/or interconnect circuitry or interface circuitry being used. Moreover, the energy-related metric may be based on an active state (when the one or more kernels are executed), or both an active state and an idle state (when the one or more kernels are not executed and waiting for a data flow to trigger them) of the one or more computer kernels. In other words, the energy-related metric may be based on the one or more compute kernels being active and based on the one or more compute kernels being idle. Thus, the processing circuitry is configured to determine, for each XPU, the energy-related metric for executing the one or more compute kernels on the respective XPU. This energy-related metric may relate to the power consumption (e.g., the additional power consumption) caused by executing the respective compute kernel on a given XPU, and/or to a thermal impact (e.g., how many watts of thermal power have to be dealt with) caused by executing the respective compute kernel on the given XPU (which may include the storage and interface circuitry power and thermal as well), Accordingly, the energy-related metric may comprises at least one of an estimated power consumption and an estimated thermal impact of the execution of the respective compute kernel on the respective XPU.

To determine the energy-related metric, the processing circuitry may parse the task graph to identify tasks that can be performed by a compute kernel being executed by an XPU, and then determine the energy-related metric for these tasks (and corresponding compute kernels). In other words, the processing circuitry may be configured to determine the energy-related metric based on the task graph. Accordingly, as further shown in FIG. 1*c*, the method may comprise determining 150 the energy-related metric based on the task graph. In addition, information from the discovery process (i.e., the discovered capabilities) may be used for this purpose. In particular, the processing capabilities (e.g., the supported ISA, the power required per instruction or time etc.), the memory capability (e.g., a memory capacity and/or memory speed), and the interconnect capability (e.g., an interconnect throughput) may be used to determine the energy-related metric, e.g., by performing a pre-selection as to which task can be performed by which XPU, and/or by using the listed capabilities as part of the determination (e.g., to estimate the energy-related metric).

A first approach for determining the energy-related metric is based on estimation. For example, the processing circuitry may be configured to determine the energy-related metric by estimating the energy-related metric. Accordingly, as further shown in FIG. 1*c*, the method may comprise determining 150 the energy-related metric by estimating 152 the energy-related metric. This estimation may be based on the discovered capabilities. For example, through static analysis of the instructions of the respective compute kernel, the number of instructions and amount of data being transferred may be estimated and used to estimate the energy-related metric (e.g., based on the supported ISA (to estimate how many instructions are required), the power required per instruction or time, the memory speed and/or the interconnect throughput (to estimate the time and/or energy required for transferring the necessary data). To determine the thermal impact, known thermal characteristics of the respective XPU may be used, and/or the thermal impact may be derived from the energy being used.

The improve upon the (static) estimation, which may be imprecise as many branching conditions or loops are dependent on the data being processed, the computer program may be executed in a sandboxed environment. In other words, the processing circuitry may be configured to determine the energy-related metric by executing the computer program in a sandboxed evaluation environment. Accordingly, as further shown in FIG. 1*c*, the method may comprise determining 150 the energy-related metric by executing 154 the computer program in the sandboxed evaluation environment. Through the execution, the number of instructions, and/or time required for performing the instructions may be determined more precisely than may be possible based on a static analysis. For this purpose (and for the execution on the actual XPU introduced in the following), either the real-world data (e.g., a portion thereof) or synthetic data may be used. For example, the processing circuitry may be configured to determine the energy-related metric based on real-world data included with, or accessible by, the computer program. Accordingly, the method may comprise determining 150 the energy-related metric based on the real-world data included with, or accessible by, the computer program. Alternatively, synthetic data may be used. For example, the processing circuitry may be configured to generate synthetic data to be used by the computer program, and to determine the energy-related metric based on the synthetic data. Accordingly, as further shown in FIG. 1*c*, the method may comprise generating 158 synthetic data to be used by the computer program and determining 150 the energy-related metric based on the synthetic data. For example, the synthetic data may be derived from the real-world data included with, or accessible by, the computer program, or it may be generated based on data structures defined by the computer program (e.g., using randomized data or using user-specified criteria for generating the synthetic data)—this is policy configurable.

A third approach is based on executing the computer program, with real-world data or synthetic data, using the respective XPUs. For example, the processing circuitry may be configured to determine or update the energy-related metric based on a monitoring of the execution of the computer program by the two or more XPUs. Accordingly, as further shown in FIG. 1*c*, the method may comprise determining 150 and/or updating 156 the energy-related metric based on a monitoring of the execution of the computer program by the two or more XPUs. For example, the processing circuitry may be configured to determine the energy-related metric based on sensor data from one or more energy-related sensors or actuators (e.g., current sensors) or thermal-related sensors or actuators (e.g., temperature sensors, fan speed controls).

Regardless of which approach is taken for determine the energy-related metric, it may now be used to assign the one or more compute kernels to the two or more XPUs. In particular, the processing circuitry may be configured to assign the execution of the one or more compute kernels such, that an energy-related goal is achieved. For example, the processing circuitry may be configured to assign the execution of the one or more compute kernels such, that the assignment results in a reduced or minimal energy consumption (compared to another assignment) of the execution of the computer program. This energy-related goal may be pre-defined (e.g., by an operator of the computer system), or be defined by the computer program itself. In other words, the energy-related goal may be pre-defined, or the energy-related goal may be defined by a service-level agreement associated with the execution of the computer program. For example, the service-level agreement may specify whether the computer program is to be executed with a focus on absolute performance or with a focus on performance per watt/thermal impact, or with a focus on a tradeoff between the two criteria.

In addition, the service-level agreement may limit the assignment of the execution of the one or more compute kernels. For example, the service-level agreement may specify which types of XPUs are to be used, or which ISAs are to be used (or not used). For example, the ISA being used may have a significant impact on the energy-related metric. Accordingly, the service-level agreement may force a particular ISA to only be used at specific energy levels. Accordingly, the service-level agreement may be based on the capabilities of the two or more different XPUs. In effect, the execution may be assigned based on the discovered capabilities (e.g., based on the supported ISAs). In some examples, the processing circuitry may be configured to negotiate the assignment with the computer program based on the SLA, thus establishing a tradeoff between the SLA, the capabilities of the two or more XPUs and the power-related metric. Another type of limitation may stem from a policy, which may be defined by the operator of the computer system. For example, the assignment of the execution of the one or more compute kernels to the two or more different XPUs is limited by one or more policies related to one or more of a deprecated instruction or deprecated instruction set, a prohibited instruction or prohibited instruction set and code execution within an XPU by out-of-band fleet management. As outlined above, such a prohibited instruction or prohibited instruction set may be based on different ISAs being provided by the XPUs having different energy-related metrics.

The assignment of the execution may have an impact on both the task graph and the one or more compute kernels. Depending on the assignment, the task graph may be re-generated, and the respective kernel may be generated or re-generated (as necessary). For example, the processing circuitry may be configured to generate or re-generate the task graph of the computer program based on the assignment of the execution of the one or more compute kernels to the two or more XPUs. Accordingly, as further shown in FIG. 1*c*, the method may comprise generating or re-generating 162 a task graph of the computer program based on the assignment of the execution of the one or more compute kernels to the two or more XPUs. For example, the task graph may be generated or re-generated such, that it includes (e.g., reflects) the assignment of the execution of the one or more compute kernels. Additionally, some of the compute kernels may be split up or combined (relative to an initial task graph), which may also impact the task graph. In other words, assigning the execution of the one or more compute kernels may comprise re-partitioning the task graph, so that at least one of the one or more compute kernels is split into two or more compute kernels, with the two or more compute kernels being assigned to the two or more XPUs, or so that two compute kernels are combined into a single compute kernel being assigned to one of the XPUs.

Moreover, the processing circuitry may be configured to generate or re-generate the one or more compute kernels based on the assignment of the execution of the one or more compute kernels to the two or more XPUs, e.g., based on the on the re-generated task graph. Accordingly, the method may comprise generating or re-generating 164 the one or more compute kernels based on the assignment of the execution of the one or more compute kernels to the two or more XPUs, e.g., based on the task graph. In general, the generation or re-generation of the one or more compute kernels may be based on the static analysis or dynamic analysis of the computer program. In particular, the processing circuitry may be configured to generate or re-generate the one or more compute kernels based on a monitoring of an execution of the computer program in the sandboxed environment or by the two or more XPUs (e.g., based on real-world or synthetic data). Accordingly, the method may comprise generating or re-generating 164 the one or more compute kernels based on a monitoring of an execution of the computer program in the sandboxed environment or by the two or more XPUs. This way, the real or synthesized data flow may be used to better gauge the behavior of the computer program, e.g., with respect to loop and branch behavior (and thus number of instructions/time required for executing the compute kernels/computer program), energy use or thermal impact.

In general, the compute kernels may be generated as an XPU-specific executable or as an XPU-agnostic executable. Therefore, the use of different computer kernels might not be necessary, depending on whether the respective compute kernel has been left untouched, split, or combined. However, in case the compute kernels are generated as XPU-specific executable, or if they are split or combined, may be required. In some cases, the different compute kernels may be generated in advance and then selected based on the assignment. In other words, the one or more compute kernels are generated in advance of the assignment. This may increase an initial effort, but reduce a time required after fixing the assignment. Alternatively, they may be generated Just-In-Time (JIT), which may provide more flexibility. In this case, the one or more compute kernels may be generated and/or regenerated just-in-time after the assignment. In some cases, a hybrid approach may be used, with some of the compute kernels being generated in advance, and others being generated just in time (e.g., compute kernels that are split or combined).

In some examples, the processing circuitry is further configured to execute the computer program. For example, the processing circuitry may be configured to transfer the compute kernel(s) and necessary data to and from the respective XPU(s) during execution of the computer program (e.g., via the interface circuitry 12).

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the computer system 100 may be a workstation computer system (e.g., a workstation computer system being used for scientific computation) or a server computer system, i.e., a computer system being used to serve functionality, such as the computer program, to one or client computers.

Some examples are based on using a machine-learning model or machine-learning algorithm. Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm, e.g. a classification algorithm, a regression algorithm or a similarity learning algorithm. Classification algorithms may be used when the outputs are restricted to a limited set of values, i.e. the input is classified to one of the limited set of values. Regression algorithms may be used when the outputs may have any numerical value (within a range). Similarity learning algorithms are similar to both classification and regression algorithms, but are based on learning from examples using a similarity function that measures how similar or related two objects are.

Reinforcement learning is a third group of machine-learning algorithms. It may particularly be used to train the above-reference machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g. based on the training performed by the machine-learning algorithm. In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input. In at least some embodiments, the machine-learning model may be deep neural network, e.g. a neural network comprising one or more layers of hidden nodes (i.e. hidden layers), preferably a plurality of layers of hidden nodes.

More details and aspects of the computer system, apparatus, device, method, and corresponding computer program are mentioned in connection with the proposed concept, or one or more examples described above or below (e.g., FIGS. 2 to 5). The computer system, apparatus, device, method, and corresponding computer program may comprise one or more additional optional features corresponding to one or more aspects of the proposed concept, or one or more examples described above or below.

The industry is at an inflection point in terms of sustainability/circular economy, where Cloud Service Providers (CSPs), Communication Service Providers (CoSPs) and manufacturers, are focused on sustainable data centers. This may require a new way of driving the logic to generate computational kernels for XPU HW, to focus on power/energy awareness in addition to performance. The present disclosure proposes "Power Thermal Cognizant Compute Kernels (PTCCK) for a sustainable compute paradigm", which may be based on based on Intel® oneAPI, that addresses this challenge.

In the following, an example is given that focuses on Intel® Data Parallel C++ (DPC++) that is part of Intel®. However, the example is more generally applicable to computer programs, where a portion of the computer program is calculated by a compute kernel that is executed by an XPU. DPC++ contains an integral task graph that defines how computational kernels may be executed and data may be moved based on control/data dependencies. A similar task graph may be used on other platforms as well.

Figure 2:
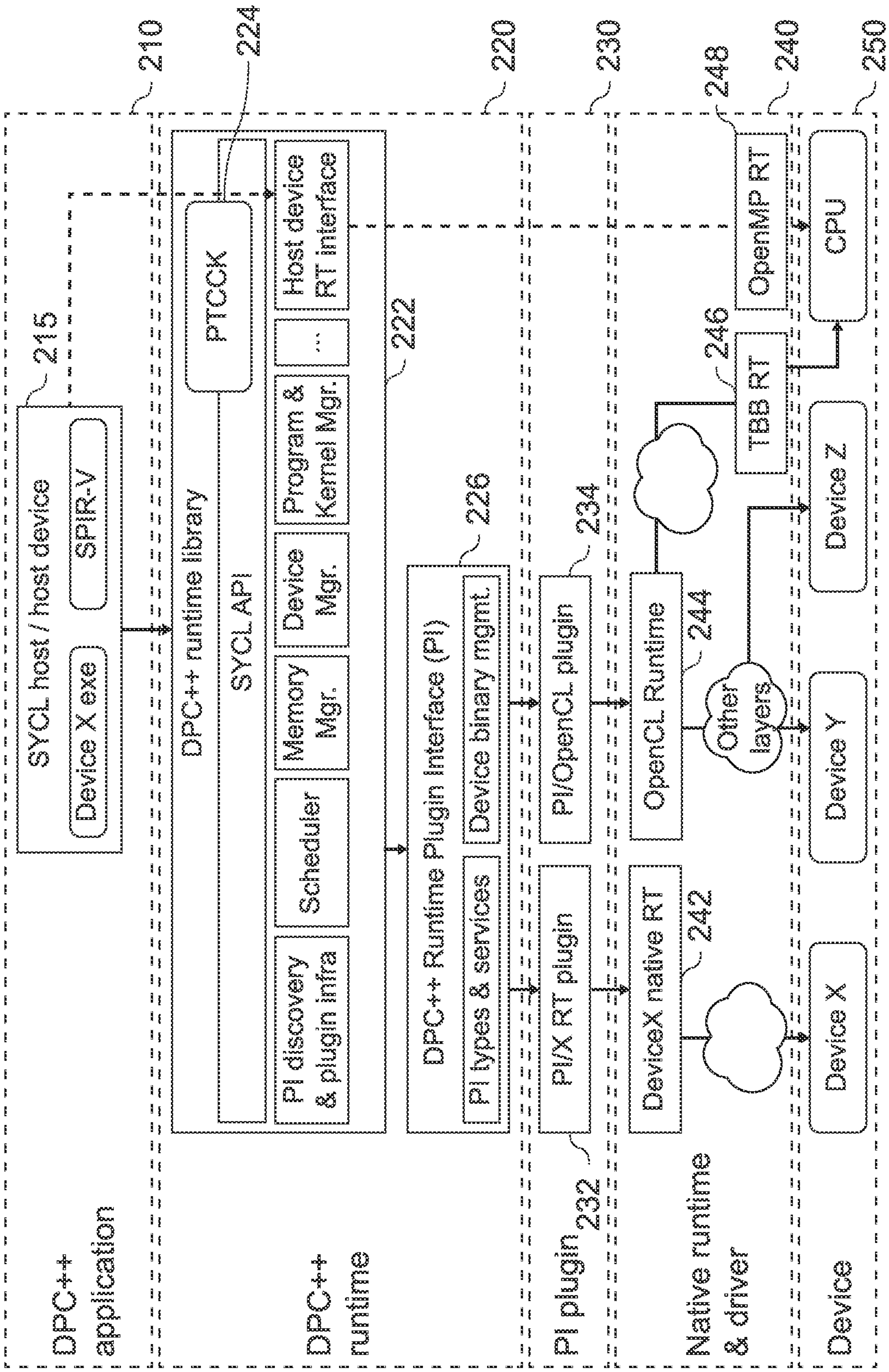
FIG. 2 shows a schematic diagram of an example of a system architecture.

FIG. 2 shows a schematic diagram of an example of a system architecture. FIG. 2 shows 5 layers of the system architecture—a DPC++ application 210, a DPC++ runtime 220, a PI (DPC++ Plugin Interface) plugin 230, a native runtime & driver 240 and a device 250. The DPC++ application 210 contains a SYCL host/host device 215 with a Device X executable and a SPIR-V (Standard Portable Intermediate Representation-V) intermediate representation. The SYCL host/host device uses a DPC++ runtime library 222, which contains a SYCL API (Application Programming Interface), a PI discovery and plugin infrastructure, a scheduler, a memory manager, a device manager, a program, and kernel manager, and a host device runtime (RT) interface, to execute the computer program. In some cases, the SYCL host/host device may bypass most of the DPC++ runtime library, and directly connect to the CPU (one of the devices 250) via the host device runtime interface and an OpenMP runtime 248 (being part of the native runtime & driver 240). The DPC++ runtime further comprises a DPC++ Runtime Plugin Interface 226, which contains PI types and services and device binary management. The DPC++ Runtime Plugin Interface may use a PIA runtime plugin 232 and/or a PI/OpenCL plugin 234, which are contained in the PI plugin layer 230. The Native runtime & driver layer 240 may contain a DeviceX native runtime 242, which interfaces between the PI/X runtime plugin 232 and Device X, an OpenCL runtime 244, which interfaces between the PI/OpenCL plugin 234 and Device Y, Device Z, and the CPU via other layers, such as the Threading Building Blocks (TBB) runtime 246. On the devices 250, power, thermal and/or energy telemetry may be collected by monitoring the execution of the kernel(s).

Figure 5:
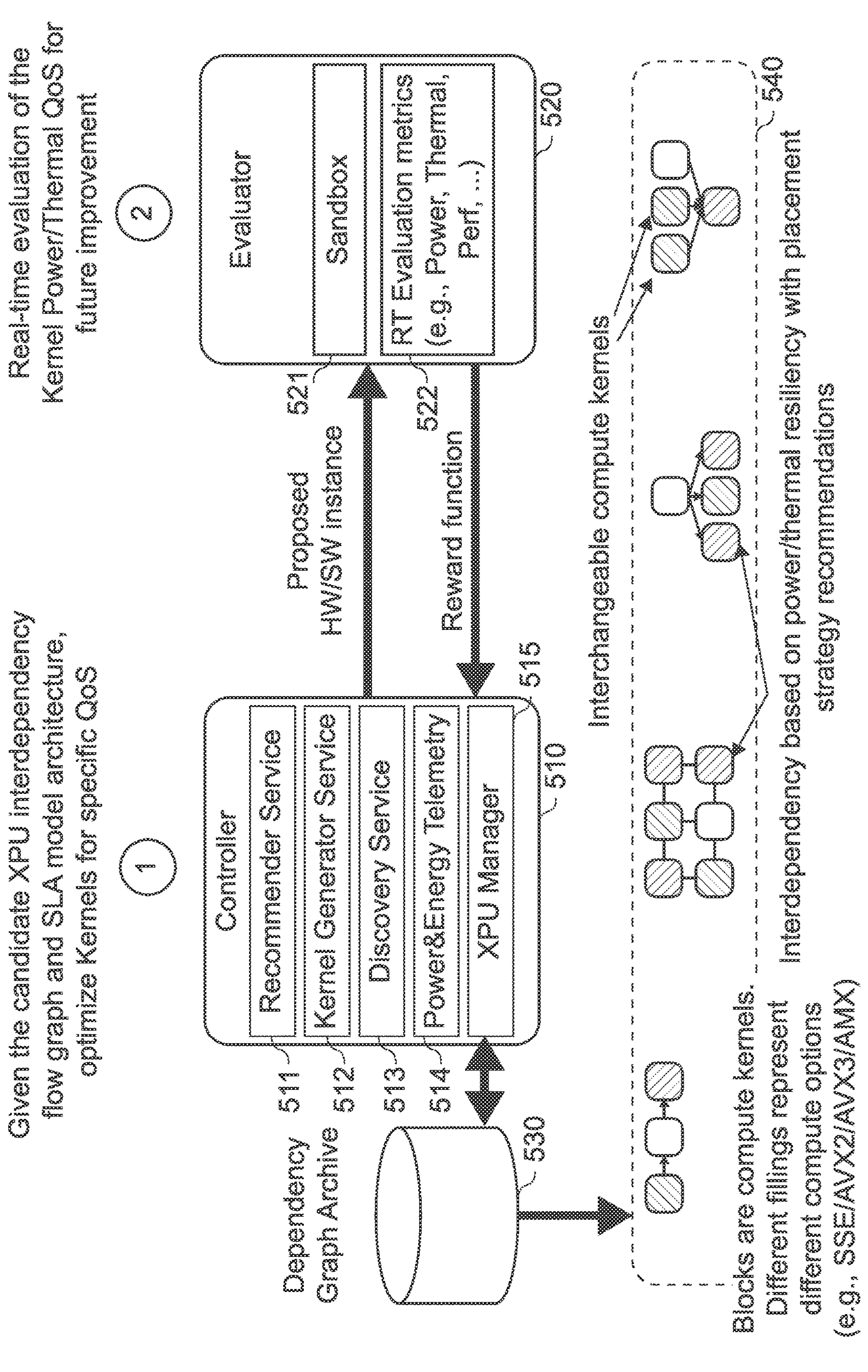
FIG. 5 shows a schematic diagram of an operational flow.

The proposed PTCCK 224, which may be implemented by, or correspond to, the apparatus 10, device 10, method or computer program introduced in connection with FIGS. 1*a* to 1*c*, may be placed inside the DPC++ runtime library, for example. For example, as shown in FIGS. 2 and 5, the proposed PTCCK may involve a discovery module 513, which may be used to discover XPU compute units, memory, and interconnect (e.g., CXL (Compute Express Link)/PCIe (Peripheral Component Interface express)/Discrete Memory Hub) capabilities. The PTCCK may further include a power and energy telemetry module 514 (e.g., to determine the energy-related metric), which may include one or more of an estimator to estimate energy from platform telemetry across various IP (intellectual property) blocks for existing task graph, compute kernels with synthetic or real data flow, an evaluator for evaluating a new task graph and computational kernels in a sandbox environment with a policy-configured synthetic data generator (introduced in the following) to trace the activation profile of the platform, and a controller which may be an at-run time monitor the platform telemetry to make sure graph execution and kernel deployment are policed and monitored based on policy configuration in conjunction with platform power management unit (PMU) (not shown in the figure). The PTCCK may further include a dynamic graph placement module (not shown in the figure), which may be a DPC++ oneAPI runtime library component that can provide an improved or optimal graph split or placement strategy recommendation (e.g., XPU only, Combination of XPUs, etc.). The PTCCK may further include a dynamic kernel generation module 512, which may be a DPC++ oneAPI runtime library component introduced to repartition the task graph and generate/re-generate associated computational kernels that can match the Power/Energy/Thermal guardrails instead of having a focus that is purely on performance.

Figures 1, 3:
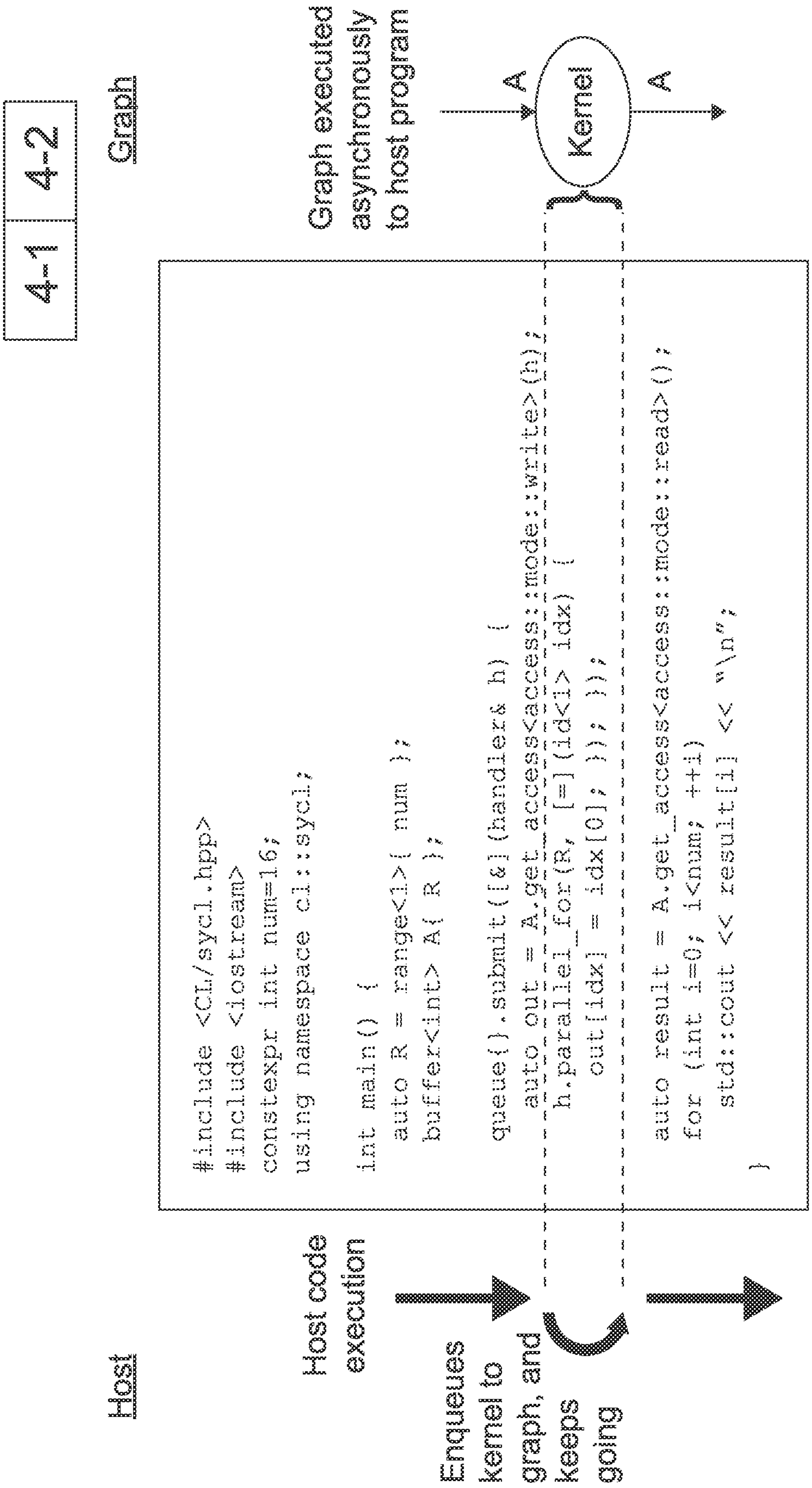
FIG. 3 shows an example that illustrates a potential compute kernel generation and placement on an XPU architecture.
Figures 2, 3:
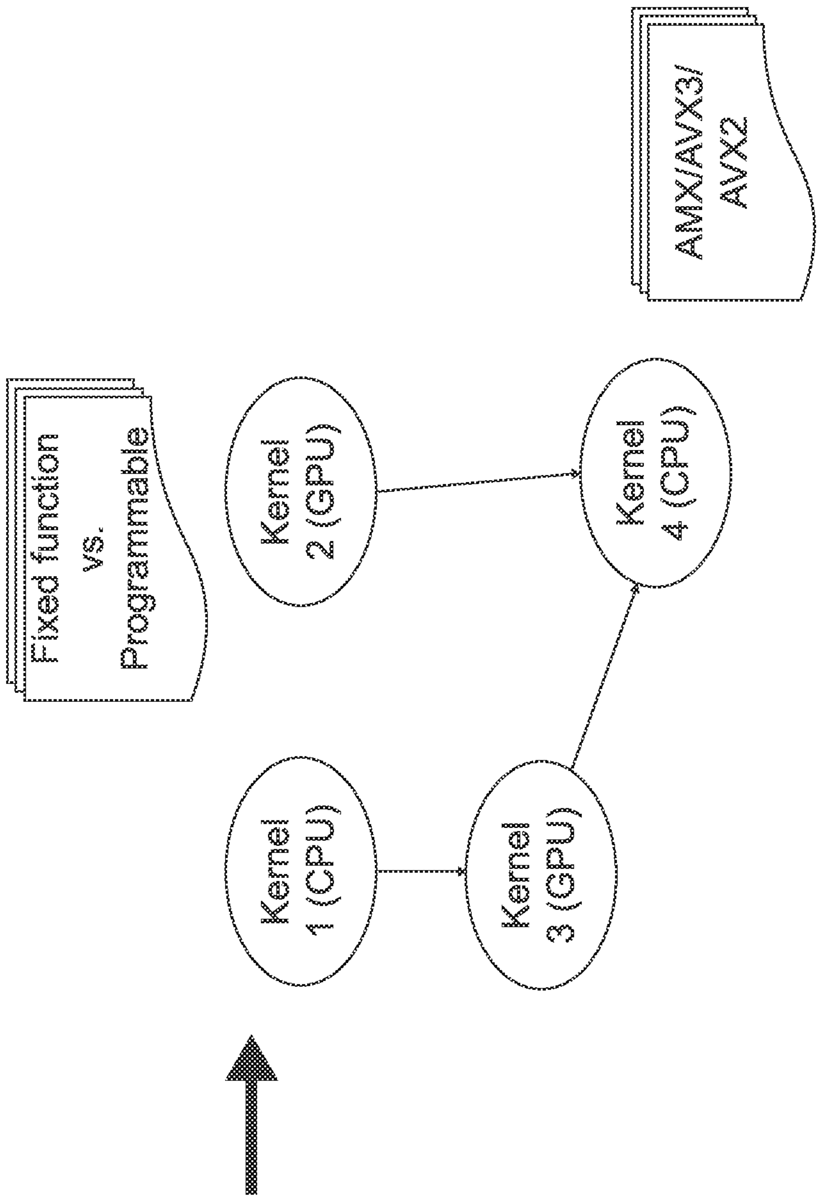

FIG. 3 shows an example that illustrates a potential compute kernel generation and placement on an XPU architecture (CPU, GPU, FPGA, ASIC), factoring in the power and thermal constraints specified and real-time power & thermal telemetry for a given XPU. This may include dynamic JIT (Just-In-Time) code generation, re-generation or mapping of existing JIT code, re-partition of the task graph based on power & thermal efficiency on XPU hardware logic elements, parallelizing kernel deployment based on task graph for power & thermal efficiency in addition to performance. On the left side of FIG. 3 (FIG. 3-1), in the middle, a code fragment is shown, which contains a portion (between the dashed lines) which can be calculated by one or more compute kernels. The host executes the code up to this point, then enqueues the kernel to the task graph, and then keeps going. The graph is executed asynchronously to the host program. The kernel may be executed by one or more XPUs (such as the CPUs/GPUs shown on the right side of FIG. 3/FIG. 3-2). The placement of the kernel may consider aspects such as the availability of fixed-function hardware vs. a use of programmable hardware, and the availability of ISAs such as Intel® AMX (Advanced Matrix Extensions), AVX2 (Advanced Vector Extensions 2) or AVX3.

Figure 4:
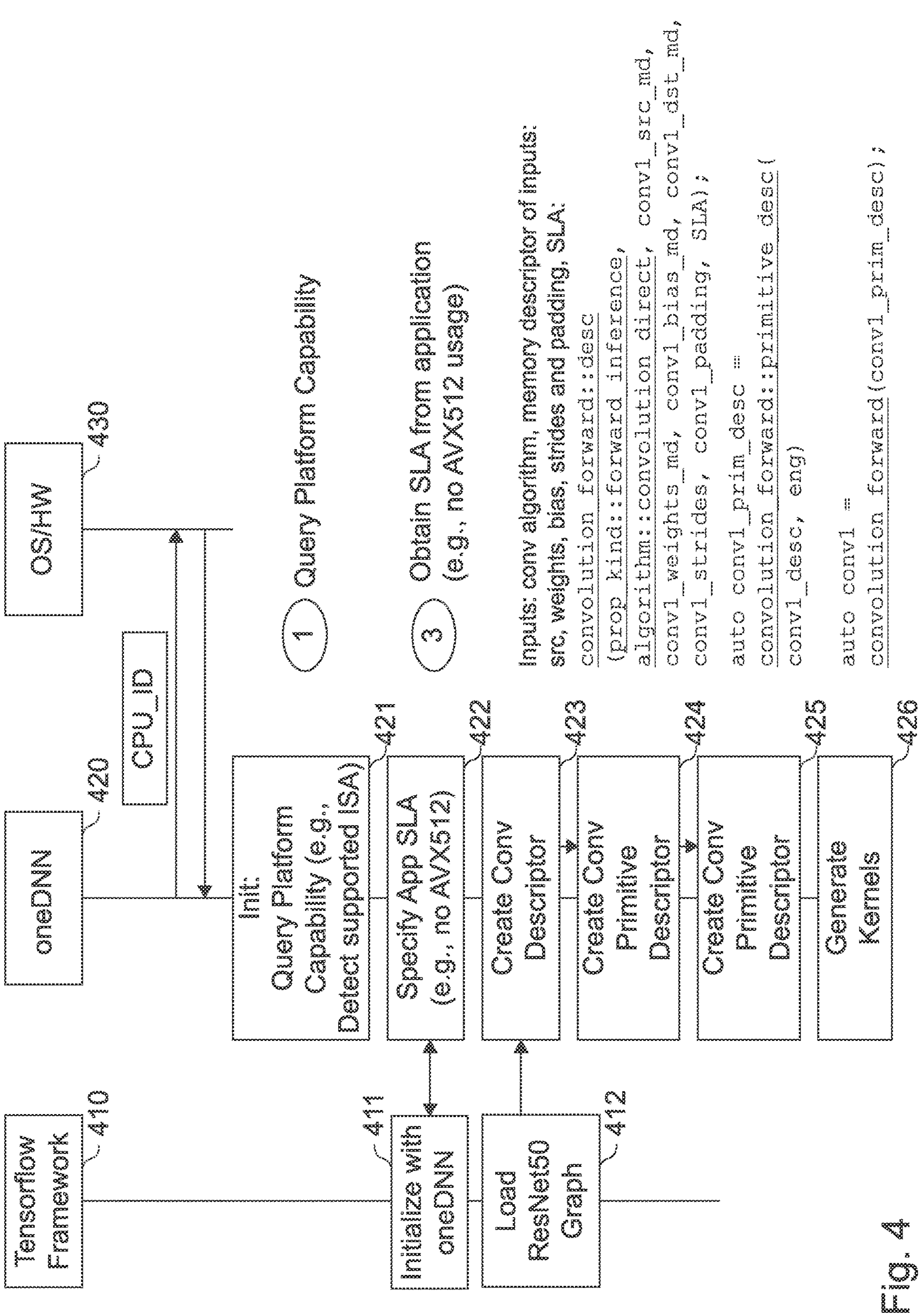
FIG. 4 shows a schematic diagram of an example of a configuration flow.

FIG. 4 shows a schematic diagram of an example of a configuration flow involving AI (Artificial Intelligence) with the Tensorflow framework 410 and interaction with oneDNN/PTCCK 420 embedded in the DPC++ runtime. At initialization, oneDNN 420 may request a CPU identifier (CPU ID) from the operating system (OS) or hardware (HW) 430. oneDNN 420 may then be initialized 421 by querying the platform capabilities (e.g., to detect a supported platform capability). The Tensorflow framework may also initialize 411 with oneDNN and specify or negotiate an SLA (Service Level Agreement) from the application to specify 422 the application SLA (e.g., to not use a certain ISA, such as AVX-512). In other words, applications may specify the power/thermal SLA/requirement to the PTCCK to influence the task graph scheduling, compute kernel generation and scheduling on the target XPU HW. The SLA specification may be bi-directional, i.e., apps may provide their energy QoS requirements, and a 'recommender service' can respond back on what the platform can support, and a negotiation may be performed. In other words, a specification of the service-level agreement may be bi-directional. The processing circuitry may be configured to negotiate the service-level agreement based on the bi-directional specification of the ser-vice-level agreement and based on the capabilities of the two or more different XPUs. For example, policy-based configuration may be used to avoid usage of any deprecated ISA or energy/thermal prohibited ISAs or code execution within an XPU by out-of-band fleet manager management. Then, the Tensorflow framework may load 412 a model, such as the ResNet 50 graph, and oneDNN may create 423 a convolution descriptor and create 424; 425 and convolution primitive descriptor. As inputs, the convolution algorithm, and a memory descriptor of inputs (for source, weights, bias, strides, padding and the SLA) may be used (as example is shown in FIG. 4). Then, oneDNN may generate 426 the respective kernels being used.

FIG. 5 shows a schematic diagram of an operational flow involving the controller 510 and evaluator 520 components proposed in the present disclosure towards generating power and thermal aware compute kernels with appropriate task graph repartition. For example, the controller 510 may comprise a recommender service 511, a kernel generator service 512, a discovery service 513, a power & energy telemetry service 514 and an XPU manager 515. The controller 510 may, given the candidate XPU interdependency flow graph (e.g., the task graph) and SLA model architecture, and improve or optimize kernels for a specific QoS (Quality of Service). For example, the controller may provide an improved or optimal placement recommendation of the compute kernels based on XPU discovery, energy profile requirement and sandbox results. The evaluator 520 may comprise a sandbox 521 and runtime evaluation metrics 522 (e.g., power, thermal, performance). The evaluator 520 may perform real-time evaluation of the kernel power/thermal QoS for future improvement. For example, the evaluator 520 may trace the power/thermal activation profile in the sandbox environment using a Synthetic Data Generator. The controller may provide the proposed hardware/software instance to the evaluator, and the evaluator may provide a reward function to the controller. Using the task graph dependency, application specified SLA for thermal and power, the controller module 510 can generate appropriate run-time (JIT) kernels 540, e.g., using a dependency graph archive 530, to take advantage of discovered XPU capabilities in a power & thermal efficient manner. This can be static (wherein multiple different copies/versions of kernels would have been generated that can be picked at run time) or dynamic using JIT (Just in Time Compilation). In other words, task graph re-generation may be performed along with associated compute kernels statically (i.e., by graph parsing) or dynamically (e.g., based on a real-world data flow) with or without a past histogram. In FIG. 5, different combinations of kernels 540 are shown. The blocks inside rectangle 540 are compute kernels, where different fillings represent different compute options (e.g., SSE (Streaming Single instruction multiple data Extensions)/AVX2/AVX3/AMX). The evaluator module 520 may police the run time kernel with active telemetry from the XPU to provide feedback and insights to the kernel generator in the controller module for the future. This can be implemented e.g., using the RL (Reinforcement Learning)-based AutoML framework for scale out and real-time adaptation. In other words, the processing circuitry may be configured to process data related to on a monitoring of the execution of the computer program (i.e., active telemetry by the XPU) by the two or more XPUs using a machine-learning model being trained to output a monitored energy-related metric based on the data related to the monitoring, and to assign the execution of the one or more compute kernels and/or to generate or re-generate the one or more compute kernels based on the output of the machine-learning model. For example, as outlined above, the RL-based AutoML framework may be used to create and/or train the machine-learning model. In effect, the evaluator 520 & controller 510 modules may police the run time kernel with active telemetry from the XPUs to provide feedback and insights into the kernel generator module for future improvements with or without Machine Learning (ML) support.

The proposed concept may introduce a power, thermal & energy-aware cost function in DPC++ oneAPI that supports task graph re-generation (dynamically without compromising functional accuracy—e.g., AI (Artificial Intelligence) or quality in terms of Media/Graphics) and associated compute Kernels based on static telemetry (graph parsing), run-time telemetry (data dependent) and histogram of past usage telemetry. It may provide graph and kernel partitioning based on (CXL) memory, input/output and discrete memory control hub capabilities. It may provide hardware and application awareness, e.g., to support virtual machine migration and to dynamically adapt a kernel to available newer hardware, avoiding invalid ISA (Instruction Set Architecture)/Execution Units due to Kernels generated for older hardware that may be deprecated in newer hardware.

More details and aspects of the PTCCK concept are mentioned in connection with the proposed concept or one or more examples described above or below (e.g., FIG. 1*a* to 1*c*). The PTCCK concept may comprise one or more additional optional features corresponding to one or more aspects of the proposed concept, or one or more examples described above or below.

In the following, some examples of the proposed concept are presented:

An example (e.g., example 1) relates to an apparatus (10) for controlling the execution of a computer program by a computer system (100) comprising two or more different Processing Units (102, 104, 106), XPUs, the apparatus comprising processing circuitry (14) configured to obtain the computer program, wherein at least a portion of the computer program is based on one or more compute kernels to be executed by the two or more different XPUs. The processing circuitry is configured to determine, for each XPU, an energy-related metric for executing the one or more compute kernels on the respective XPU. The processing circuitry is configured to assign the execution of the one or more compute kernels to the two or more different XPUs based on the respective energy-related metric.

Another example (e.g., example 2) relates to a previously described example (e.g., example 1) or to any of the examples described herein, further comprising that the energy-related metric comprises at least one of an estimated power consumption and an estimated thermal impact of the execution of the respective compute kernel on the respective XPU.

Another example (e.g., example 3) relates to a previously described example (e.g., one of the examples 1 to 2) or to any of the examples described herein, further comprising that the processing circuitry is configured to assign the execution of the one or more compute kernels such, that an energy-related goal is achieved.

Another example (e.g., example 4) relates to a previously described example (e.g., example 3) or to any of the examples described herein, further comprising that the energy-related goal is pre-defined, or wherein the energy-related goal is defined by a service-level agreement associated with the execution of the computer program.

Another example (e.g., example 5) relates to a previously described example (e.g., example 4) or to any of the examples described herein, further comprising that the service-level agreement is based on the capabilities of the two or more different XPUs.

Another example (e.g., example 6) relates to a previously described example (e.g., example 5) or to any of the examples described herein, further comprising that a specification of the service-level agreement is bi-directional, wherein the processing circuitry is configured to negotiate the service-level agreement based on the bi-directional specification of the service-level agreement and based on the capabilities of the two or more different XPUs.

Another example (e.g., example 7) relates to a previously described example (e.g., one of the examples 1 to 6) or to any of the examples described herein, further comprising that the processing circuitry is configured to determine a task graph of the computer program, with the one or more compute kernels being part of the task graph, and to determine the energy-related metric based on the task graph.

Another example (e.g., example 8) relates to a previously described example (e.g., example 7) or to any of the examples described herein, further comprising that assigning the execution of the one or more compute kernels comprises re-partitioning the task graph, so that at least one of the one or more compute kernels is split into two or more compute kernels, with the two or more compute kernels being assigned to the two or more XPUs.

Another example (e.g., example 9) relates to a previously described example (e.g., one of the examples 1 to 8) or to any of the examples described herein, further comprising that the processing circuitry is configured to generate or re-generate the one or more compute kernels based on the assignment of the execution of the one or more compute kernels to the two or more XPUs.

Another example (e.g., example 10) relates to a previously described example (e.g., example 9) or to any of the examples described herein, further comprising that the processing circuitry is configured to generate or re-generate the one or more compute kernels based on a monitoring of an execution of the computer program in a sandboxed environment or by the two or more XPUs.

Another example (e.g., example 11) relates to a previously described example (e.g., one of the examples 9 to 10) or to any of the examples described herein, further comprising that the one or more compute kernels are generated and/or regenerated in advance of the assignment.

Another example (e.g., example 12) relates to a previously described example (e.g., one of the examples 9 to 10) or to any of the examples described herein, further comprising that the one or more compute kernels are generated and/or regenerated just-in-time after the assignment.

Another example (e.g., example 13) relates to a previously described example (e.g., one of the examples 9 to 12) or to any of the examples described herein, further comprising that the processing circuitry is configured to generate or re-generate a task graph of the computer program based on the assignment of the execution of the one or more compute kernels to the two or more XPUs, and to generate or re-generate the one or more compute kernels based on the task graph.

Another example (e.g., example 14) relates to a previously described example (e.g., example 13) or to any of the examples described herein, further comprising that the processing circuitry is configured to generate or re-generate the task graph based on a static analysis of the computer program.

Another example (e.g., example 15) relates to a previously described example (e.g., one of the examples 13 to 14) or to any of the examples described herein, further comprising that the processing circuitry is configured to generate or re-generate the task graph based on a dynamic analysis of the computer program based on a real-world current data flow and/or a real-world past data flow.

Another example (e.g., example 16) relates to a previously described example (e.g., one of the examples 1 to 15) or to any of the examples described herein, further comprising that the processing circuitry is configured to determine the energy-related metric by estimating the energy-related metric.

Another example (e.g., example 17) relates to a previously described example (e.g., one of the examples 1 to 16) or to any of the examples described herein, further comprising that the processing circuitry is configured to determine the energy-related metric by executing the computer program in a sandboxed evaluation environment.

Another example (e.g., example 18) relates to a previously described example (e.g., one of the examples 16 to 17) or to any of the examples described herein, further comprising that the processing circuitry is configured to determine the energy-related metric based on real-world data included with, or accessible by, the computer program.

Another example (e.g., example 19) relates to a previously described example (e.g., one of the examples 1 to 18) or to any of the examples described herein, further comprising that the processing circuitry is configured to update the energy-related metric based on a monitoring of the execution of the computer program by the two or more XPUs.

Another example (e.g., example 20) relates to a previously described example (e.g., one of the examples 1 to 19) or to any of the examples described herein, further comprising that the processing circuitry is configured to generate synthetic data to be used by the computer program, and to determine the energy-related metric based on the synthetic data.

Another example (e.g., example 21) relates to a previously described example (e.g., one of the examples 1 to 20) or to any of the examples described herein, further comprising that the processing circuitry is configured to process data related to on a monitoring of the execution of the computer program by the two or more XPUs using a machine-learning model being trained to output a monitored energy-related metric based on the data related to the monitoring, and to assign the execution of the one or more compute kernels and/or to generate or re-generate the one or more compute kernels based on the output of the machine-learning model.

Another example (e.g., example 22) relates to a previously described example (e.g., one of the examples 1 to 21) or to any of the examples described herein, further comprising that the processing circuitry is configured to discover capabilities of the two or more XPUs of the computer system, and to determine the energy-related metric and/or to assign the execution based on the discovered capabilities.

Another example (e.g., example 23) relates to a previously described example (e.g., example 22) or to any of the examples described herein, further comprising that the capabilities comprise one or more of a compute capability, a memory capability, and an interconnect capability of the respective XPU.

Another example (e.g., example 24) relates to a previously described example (e.g., one of the examples 1 to 23) or to any of the examples described herein, further comprising that the two or more XPUs comprise two or more of the group of a Central Processing Unit, CPU, a Graphics Processing Unit, GPU, a Field-Programmable Gate Array, FPGA, an Artificial Intelligence, AI, accelerator, and a communication processing offloading unit.

Another example (e.g., example 25) relates to a previously described example (e.g., one of the examples 1 to 24) or to any of the examples described herein, further comprising that the processing circuitry is configured to provide a runtime environment for the execution of the computer program, wherein the determination of the energy-related metric and the assignment of the execution is performed by the runtime environment.

Another example (e.g., example 26) relates to a previously described example (e.g., one of the examples 1 to 25) or to any of the examples described herein, further comprising that the assignment of the execution of the one or more compute kernels to the two or more different XPUs is limited by one or more policies related to one or more of a deprecated instruction or deprecated instruction set, a prohibited instruction or prohibited instruction set and code execution within an XPU by out-of-band fleet management.

Another example (e.g., example 27) relates to a previously described example (e.g., one of the examples 1 to 26) or to any of the examples described herein, further comprising that the energy-related metric is based on the one or more compute kernels being active and based on the one or more compute kernels being idle.

An example (e.g., example 28) relates to a computer system (100) comprising the apparatus (10) according to one of the examples 1 to 27 and the two or more XPUs (102, 104, 106).

An example (e.g., example 29) relates to a device (10) for controlling the execution of a computer program by a computer system (100) comprising two or more different Processing Units (102, 104, 106), XPUs, the device comprising means for processing (14) configured to obtain the computer program, wherein at least a portion of the computer program is based on one or more compute kernels to be executed by the two or more different XPUs. The means for processing is configured to determine, for each XPU, an energy-related metric for executing the one or more compute kernels on the respective XPU. The means for processing is configured to assign the execution of the one or more compute kernels to the two or more different XPUs based on the respective energy-related metric.

Another example (e.g., example 30) relates to a previously described example (e.g., example 29) or to any of the examples described herein, further comprising that the energy-related metric comprises at least one of an estimated power consumption and an estimated thermal impact of the execution of the respective compute kernel on the respective XPU.

Another example (e.g., example 31) relates to a previously described example (e.g., one of the examples 29 to 30) or to any of the examples described herein, further comprising that the means for processing is configured to assign the execution of the one or more compute kernels such, that an energy-related goal is achieved.

Another example (e.g., example 32) relates to a previously described example (e.g., example 31) or to any of the examples described herein, further comprising that the energy-related goal is pre-defined, or wherein the energy-related goal is defined by a service-level agreement associated with the execution of the computer program.

Another example (e.g., example 33) relates to a previously described example (e.g., example 32) or to any of the examples described herein, further comprising that the service-level agreement is based on the capabilities of the two or more different XPUs.

Another example (e.g., example 34) relates to a previously described example (e.g., example 33) or to any of the examples described herein, further comprising that a specification of the service-level agreement is bi-directional, wherein the means for processing is configured to negotiate the service-level agreement based on the bi-directional specification of the service-level agreement and based on the capabilities of the two or more different XPUs.

Another example (e.g., example 35) relates to a previously described example (e.g., one of the examples 29 to 34) or to any of the examples described herein, further comprising that the means for processing is configured to determine a task graph of the computer program, with the one or more compute kernels being part of the task graph, and to determine the energy-related metric based on the task graph.

Another example (e.g., example 36) relates to a previously described example (e.g., example 35) or to any of the examples described herein, further comprising that assigning the execution of the one or more compute kernels comprises re-partitioning the task graph, so that at least one of the one or more compute kernels is split into two or more compute kernels, with the two or more compute kernels being assigned to the two or more XPUs.

Another example (e.g., example 37) relates to a previously described example (e.g., one of the examples 29 to 36) or to any of the examples described herein, further comprising that the means for processing is configured to generate or re-generate the one or more compute kernels based on the assignment of the execution of the one or more compute kernels to the two or more XPUs.

Another example (e.g., example 38) relates to a previously described example (e.g., example 37) or to any of the examples described herein, further comprising that the means for processing is configured to generate or re-generate the one or more compute kernels based on a monitoring of an execution of the computer program in a sandboxed environment or by the two or more XPUs.

Another example (e.g., example 39) relates to a previously described example (e.g., one of the examples 37 to 38) or to any of the examples described herein, further comprising that the one or more compute kernels are generated and/or regenerated in advance of the assignment.

Another example (e.g., example 40) relates to a previously described example (e.g., one of the examples 37 to 38) or to any of the examples described herein, further comprising that the one or more compute kernels are generated and/or regenerated just-in-time after the assignment.

Another example (e.g., example 41) relates to a previously described example (e.g., one of the examples 37 to 40) or to any of the examples described herein, further comprising that the means for processing is configured to generate or re-generate a task graph of the computer program based on the assignment of the execution of the one or more compute kernels to the two or more XPUs, and to generate or re-generate the one or more compute kernels based on the task graph.

Another example (e.g., example 42) relates to a previously described example (e.g., example 41) or to any of the examples described herein, further comprising that the means for processing is configured to generate or re-generate the task graph based on a static analysis of the computer program.

Another example (e.g., example 43) relates to a previously described example (e.g., one of the examples 41 to 42) or to any of the examples described herein, further comprising that the means for processing is configured to generate or re-generate the task graph based on a dynamic analysis of the computer program based on a real-world current data flow and/or a real-world past data flow.

Another example (e.g., example 44) relates to a previously described example (e.g., one of the examples 29 to 43) or to any of the examples described herein, further comprising that the means for processing is configured to determine the energy-related metric by estimating the energy-related metric.

Another example (e.g., example 45) relates to a previously described example (e.g., one of the examples 29 to 44) or to any of the examples described herein, further comprising that the means for processing is configured to determine the energy-related metric by executing the computer program in a sandboxed evaluation environment.

Another example (e.g., example 46) relates to a previously described example (e.g., one of the examples 44 to 45) or to any of the examples described herein, further comprising that the means for processing is configured to determine the energy-related metric based on real-world data included with, or accessible by, the computer program.

Another example (e.g., example 47) relates to a previously described example (e.g., one of the examples 29 to 46) or to any of the examples described herein, further comprising that the means for processing is configured to update the energy-related metric based on a monitoring of the execution of the computer program by the two or more XPUs.

Another example (e.g., example 48) relates to a previously described example (e.g., one of the examples 45 to 47) or to any of the examples described herein, further comprising that the means for processing is configured to generate synthetic data to be used by the computer program, and to determine the energy-related metric based on the synthetic data.

Another example (e.g., example 49) relates to a previously described example (e.g., one of the examples 29 to 48) or to any of the examples described herein, further comprising that the means for processing is configured to process data related to on a monitoring of the execution of the computer program by the two or more XPUs using a machine-learning model being trained to output a monitored energy-related metric based on the data related to the monitoring, and to assign the execution of the one or more compute kernels and/or to generate or regenerate the one or more compute kernels based on the output of the machine-learning model.

Another example (e.g., example 50) relates to a previously described example (e.g., one of the examples 29 to 49) or to any of the examples described herein, further comprising that the means for processing is configured to discover capabilities of the two or more XPUs of the computer system, and to determine the energy-related metric and/or to assign the execution based on the discovered capabilities.

Another example (e.g., example 51) relates to a previously described example (e.g., example 50) or to any of the examples described herein, further comprising that the capabilities comprise one or more of a compute capability, a memory capability, and an interconnect capability of the respective XPU.

Another example (e.g., example 52) relates to a previously described example (e.g., one of the examples 29 to 51) or to any of the examples described herein, further comprising that the two or more XPUs comprise two or more of the group of a Central Processing Unit, CPU, a Graphics Processing Unit, GPU, a Field-Programmable Gate Array, FPGA, an Artificial Intelligence, AI, accelerator, and a communication processing offloading unit.

Another example (e.g., example 53) relates to a previously described example (e.g., one of the examples 29 to 52) or to any of the examples described herein, further comprising that the means for processing is configured to provide a runtime environment for the execution of the computer program, wherein the determination of the energy-related metric and the assignment of the execution is performed by the runtime environment.

Another example (e.g., example 54) relates to a previously described example (e.g., one of the examples 29 to 53) or to any of the examples described herein, further comprising that the assignment of the execution of the one or more compute kernels to the two or more different XPUs is limited by one or more policies related to one or more of a deprecated instruction or deprecated instruction set, a prohibited instruction or prohibited instruction set and code execution within an XPU by out-of-band fleet management.

Another example (e.g., example 55) relates to a previously described example (e.g., one of the examples 29 to 54) or to any of the examples described herein, further comprising that the energy-related metric is based on the one or more compute kernels being active and based on the one or more compute kernels being idle.

An example (e.g., example 56) relates to a computer system (100) comprising the apparatus (10) according to one of the examples 29 to 55 and the two or more XPUs (102, 104, 106).

An example (e.g., example 57) relates to a method for controlling the execution of a computer program by a computer system comprising two or more different Processing Units, XPUs, the method comprising obtaining (130) the computer program, wherein at least a portion of the computer program is based on one or more compute kernels to be executed by the two or more different XPUs. The method comprises determining (150), for each XPU, an energy-related metric for executing the one or more compute kernels on the respective XPU. The method comprises assigning (160) the execution of the one or more compute kernels to the two or more different XPUs based on the respective energy-related metric.

Another example (e.g., example 58) relates to a previously described example (e.g., example 57) or to any of the examples described herein, further comprising that the energy-related metric comprises at least one of an estimated power consumption and an estimated thermal impact of the execution of the respective compute kernel on the respective XPU.

Another example (e.g., example 59) relates to a previously described example (e.g., one of the examples 57 to 58) or to any of the examples described herein, further comprising that the method comprises assigning the execution of the one or more compute kernels such, that an energy-related goal is achieved.

Another example (e.g., example 60) relates to a previously described example (e.g., example 59) or to any of the examples described herein, further comprising that the energy-related goal is pre-defined, or wherein the energy-related goal is defined by a service-level agreement associated with the execution of the computer program.

Another example (e.g., example 61) relates to a previously described example (e.g., example 61) or to any of the examples described herein, further comprising that the service-level agreement is based on the capabilities of the two or more different XPUs.

Another example (e.g., example 62) relates to a previously described example (e.g., example 61) or to any of the examples described herein, further comprising that a specification of the service-level agreement is bi-directional, wherein the method comprises negotiating the service-level agreement based on the bi-directional specification of the service-level agreement and based on the capabilities of the two or more different XPUs.

Another example (e.g., example 63) relates to a previously described example (e.g., one of the examples 57 to 62) or to any of the examples described herein, further comprising that the method comprises determining (140) a task graph of the computer program, with the one or more compute kernels being part of the task graph and determining (150) the energy-related metric based on the task graph.

Another example (e.g., example 64) relates to a previously described example (e.g., example 63) or to any of the examples described herein, further comprising that assigning the execution of the one or more compute kernels comprises re-partitioning the task graph, so that at least one of the one or more compute kernels is split into two or more compute kernels, with the two or more compute kernels being assigned to the two or more XPUs.

Another example (e.g., example 65) relates to a previously described example (e.g., one of the examples 57 to 64) or to any of the examples described herein, further comprising that the method comprises generating or re-generating (164) the one or more compute kernels based on the assignment of the execution of the one or more compute kernels to the two or more XPUs.

Another example (e.g., example 66) relates to a previously described example (e.g., example 65) or to any of the examples described herein, further comprising that the method comprises generating or re-generating (164) the one or more compute kernels based on a monitoring of an execution of the computer program in a sandboxed environment or by the two or more XPUs.

Another example (e.g., example 67) relates to a previously described example (e.g., one of the examples 65 to 66) or to any of the examples described herein, further comprising that the one or more compute kernels are generated and/or regenerated in advance of the assignment.

Another example (e.g., example 68) relates to a previously described example (e.g., one of the examples 65 to 66) or to any of the examples described herein, further comprising that the one or more compute kernels are generated and/or regenerated just-in-time after the assignment.

Another example (e.g., example 69) relates to a previously described example (e.g., one of the examples 65 to 68) or to any of the examples described herein, further comprising that the method comprises generating or re-generating (162) a task graph of the computer program based on the assignment of the execution of the one or more compute kernels to the two or more XPUs, and generating or re-generating (164) the one or more compute kernels based on the task graph.

Another example (e.g., example 70) relates to a previously described example (e.g., example 69) or to any of the examples described herein, further comprising that the method comprises generating or re-generating (162) the task graph based on a static analysis of the computer program.

Another example (e.g., example 71) relates to a previously described example (e.g., one of the examples 69 to 70) or to any of the examples described herein, further comprising that the method comprises generating or re-generating (162) the task graph based on a dynamic analysis of the computer program based on a real-world current data flow and/or a real-world past data flow.

Another example (e.g., example 72) relates to a previously described example (e.g., one of the examples 57 to 71) or to any of the examples described herein, further comprising that the method comprises determining (150) the energy-related metric by estimating (152) the energy-related metric.

Another example (e.g., example 73) relates to a previously described example (e.g., one of the examples 57 to 72) or to any of the examples described herein, further comprising that the method comprises determining (150) the energy-related metric by executing (154) the computer program in a sandboxed evaluation environment.

Another example (e.g., example 74) relates to a previously described example (e.g., one of the examples 72 to 73) or to any of the examples described herein, further comprising that the method comprises determining (150) the energy-related metric based on real-world data included with, or accessible by, the computer program.

Another example (e.g., example 75) relates to a previously described example (e.g., one of the examples 57 to 74) or to any of the examples described herein, further comprising that the method comprises updating (156) the energy-related metric based on a monitoring of the execution of the computer program by the two or more XPUs.

Another example (e.g., example 76) relates to a previously described example (e.g., one of the examples 57 to 74) or to any of the examples described herein, further comprising that the method comprises generating (158) synthetic data to be used by the computer program and determining (150) the energy-related metric based on the synthetic data.

Another example (e.g., example 77) relates to a previously described example (e.g., one of the examples 57 to 76) or to any of the examples described herein, further comprising that the method comprises processing data related to on a monitoring of the execution of the computer program by the two or more XPUs using a machine-learning model being trained to output a monitored energy-related metric based on the data related to the monitoring, the assignment of the execution of the one or more compute kernels and/or a generation or re-generation the one or more compute kernels being based on the output of the machine-learning model.

Another example (e.g., example 78) relates to a previously described example (e.g., one of the examples 57 to 77) or to any of the examples described herein, further comprising that the method comprises discovering (120) capabilities of the two or more XPUs of the computer system, and to determine the energy-related metric and/or to assign the execution based on the discovered capabilities.

Another example (e.g., example 79) relates to a previously described example (e.g., example 78) or to any of the examples described herein, further comprising that the capabilities comprise one or more of a compute capability, a memory capability, and an interconnect capability of the respective XPU.

Another example (e.g., example 80) relates to a previously described example (e.g., one of the examples 57 to 79) or to any of the examples described herein, further comprising that the two or more XPUs comprise two or more of the group of a Central Processing Unit, CPU, a Graphics Processing Unit, GPU, a Field-Programmable Gate Array, FPGA, an Artificial Intelligence, AI, accelerator, and a communication processing offloading unit.

Another example (e.g., example 81) relates to a previously described example (e.g., one of the examples 57 to 80) or to any of the examples described herein, further comprising that the method comprises providing (110) a runtime environment for the execution of the computer program, wherein the determination of the energy-related metric and the assignment of the execution is performed by the runtime environment.

Another example (e.g., example 82) relates to a previously described example (e.g., one of the examples 57 to 81) or to any of the examples described herein, further comprising that the assignment of the execution of the one or more compute kernels to the two or more different XPUs is limited by one or more policies related to one or more of a deprecated instruction or deprecated instruction set, a prohibited instruction or prohibited instruction set and code execution within an XPU by out-of-band fleet management.

Another example (e.g., example 83) relates to a previously described example (e.g., one of the examples 57 to 82) or to any of the examples described herein, further comprising that the energy-related metric is based on the one or more compute kernels being active and based on the one or more compute kernels being idle.

An example (e.g., example 84) relates to a computer system comprising two or more XPUs, the computer system being configured to perform the method of one of the examples 57 to 83.

An example (e.g., example 85) relates to an apparatus (10) for controlling the execution of a computer program by a computer system (100) comprising two or more different Processing Units (102, 104, 106), XPUs, the apparatus comprising interface circuitry (12), machine-readable instructions and processing circuitry (14) to execute the machine-readable instructions to obtain the computer program, wherein at least a portion of the computer program is based on one or more compute kernels to be executed by the two or more different XPUs. The machine-readable instructions comprise instructions to determine, for each XPU, an energy-related metric for executing the one or more compute kernels on the respective XPU. The machine-readable instructions comprise instructions to assign the execution of the one or more compute kernels to the two or more different XPUs based on the respective energy-related metric.

Another example (e.g., example 86) relates to a previously described example (e.g., example 85) or to any of the examples described herein, further comprising that the energy-related metric comprises at least one of an estimated power consumption and an estimated thermal impact of the execution of the respective compute kernel on the respective XPU.

Another example (e.g., example 87) relates to a previously described example (e.g., one of the examples 85 to 86) or to any of the examples described herein, further comprising that the machine-readable instructions comprise instructions to assign the execution of the one or more compute kernels such, that an energy-related goal is achieved.

Another example (e.g., example 88) relates to a previously described example (e.g., example 87) or to any of the examples described herein, further comprising that the energy-related goal is pre-defined, or wherein the energy-related goal is defined by a service-level agreement associated with the execution of the computer program.

Another example (e.g., example 89) relates to a previously described example (e.g., example 88) or to any of the examples described herein, further comprising that the service-level agreement is based on the capabilities of the two or more different XPUs.

Another example (e.g., example 90) relates to a previously described example (e.g., example 89) or to any of the examples described herein, further comprising that a specification of the service-level agreement is bi-directional, wherein the machine-readable instructions comprise instructions to negotiate the service-level agreement based on the bi-directional specification of the service-level agreement and based on the capabilities of the two or more different XPUs.

Another example (e.g., example 91) relates to a previously described example (e.g., one of the examples 85 to 90) or to any of the examples described herein, further comprising that the machine-readable instructions comprise instructions to determine a task graph of the computer program, with the one or more compute kernels being part of the task graph, and to determine the energy-related metric based on the task graph.

Another example (e.g., example 92) relates to a previously described example (e.g., example 91) or to any of the examples described herein, further comprising that assigning the execution of the one or more compute kernels comprises re-partitioning the task graph, so that at least one of the one or more compute kernels is split into two or more compute kernels, with the two or more compute kernels being assigned to the two or more XPUs.

Another example (e.g., example 93) relates to a previously described example (e.g., one of the examples 85 to 92) or to any of the examples described herein, further comprising that the machine-readable instructions comprise instructions to generate or re-generate the one or more compute kernels based on the assignment of the execution of the one or more compute kernels to the two or more XPUs.

Another example (e.g., example 94) relates to a previously described example (e.g., example 93) or to any of the examples described herein, further comprising that the machine-readable instructions comprise instructions to generate or re-generate the one or more compute kernels based on a monitoring of an execution of the computer program in a sandboxed environment or by the two or more XPUs.

Another example (e.g., example 95) relates to a previously described example (e.g., one of the examples 93 to 94) or to any of the examples described herein, further comprising that the one or more compute kernels are generated and/or regenerated in advance of the assignment.

Another example (e.g., example 96) relates to a previously described example (e.g., one of the examples 93 to 94) or to any of the examples described herein, further comprising that the one or more compute kernels are generated and/or regenerated just-in-time after the assignment.

Another example (e.g., example 97) relates to a previously described example (e.g., one of the examples 93 to 96) or to any of the examples described herein, further comprising that the machine-readable instructions comprise instructions to generate or re-generate a task graph of the computer program based on the assignment of the execution of the one or more compute kernels to the two or more XPUs, and to generate or re-generate the one or more compute kernels based on the task graph.

Another example (e.g., example 98) relates to a previously described example (e.g., example 97) or to any of the examples described herein, further comprising that the machine-readable instructions comprise instructions to generate or re-generate the task graph based on a static analysis of the computer program.

Another example (e.g., example 99) relates to a previously described example (e.g., one of the examples 97 to 98) or to any of the examples described herein, further comprising that the machine-readable instructions comprise instructions to generate or re-generate the task graph based on a dynamic analysis of the computer program based on a real-world current data flow and/or a real-world past data flow.

Another example (e.g., example 100) relates to a previously described example (e.g., one of the examples 85 to 99) or to any of the examples described herein, further comprising that the machine-readable instructions comprise instructions to determine the energy-related metric by estimating the energy-related metric.

Another example (e.g., example 101) relates to a previously described example (e.g., one of the examples 85 to 100) or to any of the examples described herein, further comprising that the machine-readable instructions comprise instructions to determine the energy-related metric by executing the computer program in a sandboxed evaluation environment.

Another example (e.g., example 102) relates to a previously described example (e.g., one of the examples 100 to 101) or to any of the examples described herein, further comprising that the machine-readable instructions comprise instructions to determine the energy-related metric based on real-world data included with, or accessible by, the computer program.

Another example (e.g., example 103) relates to a previously described example (e.g., one of the examples 85 to 102) or to any of the examples described herein, further comprising that the machine-readable instructions comprise instructions to update the energy-related metric based on a monitoring of the execution of the computer program by the two or more XPUs.

Another example (e.g., example 104) relates to a previously described example (e.g., one of the examples 85 to 103) or to any of the examples described herein, further comprising that the machine-readable instructions comprise instructions to generate synthetic data to be used by the computer program, and to determine the energy-related metric based on the synthetic data.

Another example (e.g., example 105) relates to a previously described example (e.g., one of the examples 85 to 104) or to any of the examples described herein, further comprising that the machine-readable instructions comprise instructions to process data related to on a monitoring of the execution of the computer program by the two or more XPUs using a machine-learning model being trained to output a monitored energy-related metric based on the data related to the monitoring, and to assign the execution of the one or more compute kernels and/or to generate or re-generate the one or more compute kernels based on the output of the machine-learning model.

Another example (e.g., example 106) relates to a previously described example (e.g., one of the examples 85 to 105) or to any of the examples described herein, further comprising that the machine-readable instructions comprise instructions to discover capabilities of the two or more XPUs of the computer system, and to determine the energy-related metric and/or to assign the execution based on the discovered capabilities.

Another example (e.g., example 107) relates to a previously described example (e.g., example 106) or to any of the examples described herein, further comprising that the capabilities comprise one or more of a compute capability, a memory capability, and an interconnect capability of the respective XPU.

Another example (e.g., example 108) relates to a previously described example (e.g., one of the examples 85 to 107) or to any of the examples described herein, further comprising that the two or more XPUs comprise two or more of the group of a Central Processing Unit, CPU, a Graphics Processing Unit, GPU, a Field-Programmable Gate Array, FPGA, an Artificial Intelligence, AI, accelerator, and a communication processing offloading unit.

Another example (e.g., example 109) relates to a previously described example (e.g., one of the examples 85 to 108) or to any of the examples described herein, further comprising that the machine-readable instructions comprise instructions to provide a runtime environment for the execution of the computer program, wherein the determination of the energy-related metric and the assignment of the execution is performed by the runtime environment.

Another example (e.g., example 110) relates to a previously described example (e.g., one of the examples 85 to 109) or to any of the examples described herein, further comprising that the assignment of the execution of the one or more compute kernels to the two or more different XPUs is limited by one or more policies related to one or more of a deprecated instruction or deprecated instruction set, a prohibited instruction or prohibited instruction set and code execution within an XPU by out-of-band fleet management.

Another example (e.g., example 111) relates to a previously described example (e.g., one of the examples 85 to 110) or to any of the examples described herein, further comprising that the energy-related metric is based on the one or more compute kernels being active and based on the one or more compute kernels being idle.

An example (e.g., example 112) relates to a computer system (100) comprising the apparatus (10) according to one of the examples 85 to 111 and the two or more XPUs (102, 104, 106).

An example (e.g., example 113) relates to a non-transitory machine-readable storage medium including program code, when executed, to cause a machine to perform the method of one of the examples 57 to 83.

An example (e.g., example 114) relates to a computer program having a program code for performing the method of one of the examples 57 to 83 when the computer program is executed on a computer, a processor, or a programmable hardware component.

An example (e.g., example 115) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor, or other programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended.

Furthermore, features of a claim should also be included for any other independent claim, even if that claim is not directly defined as dependent on that other independent claim.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present, or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

What is claimed is:

1. An apparatus for controlling execution of a computer program by a computer system comprising two or more different Processing Units (XPUs), the apparatus comprising interface circuitry, machine-readable instructions and processing circuitry to execute the machine-readable instructions to:

obtain the computer program, wherein at least a portion of the computer program is based on one or more compute kernels to be executed by the two or more different XPUs;

execute the computer program in a sandboxed evaluation environment;

determine, for each XPU, an energy-related metric for executing the one or more compute kernels on the respective XPU based on the execution of the computer program in the sandboxed evaluation environment; and assign the execution of the one or more compute kernels to the two or more different XPUs based on the respective energy-related metric, wherein the machine-readable instructions comprise instructions to assign the execution of the one or more compute kernels such that an energy-related goal is achieved, wherein the energy-related goal is defined by a service-level agreement associated with execution of the computer program, wherein the service-level agreement is based on capabilities of the two or more different XPUs, and a specification of the service-level agreement is bi-directional, wherein the machine-readable instructions comprise instructions to negotiate the service-level agreement based on the bi-directional specification of the service-level agreement and based on the capabilities of the two or more different XPUs.

2. The apparatus according to claim 1, wherein the energy-related metric comprises at least one of an estimated power consumption and an estimated thermal impact of the execution of the respective compute kernel on the respective XPU.

3. The apparatus according to claim 1, wherein the machine-readable instructions comprise instructions to determine a task graph of the computer program, with the one or more compute kernels being part of the task graph, and to determine the energy-related metric based on the task graph.

4. The apparatus according to claim 3, wherein the assigning the execution of the one or more compute kernels comprises re-partitioning the task graph, SO that at least one of the one or more compute kernels is split into two or more compute kernels, with the two or more compute kernels being assigned to the two or more XPUs.

5. The apparatus according to claim 1, wherein the machine-readable instructions comprise instructions to generate or re-generate the one or more compute kernels based on the assignment of the execution of the one or more compute kernels to the two or more XPUs.

6. The apparatus according to claim 5, wherein the machine-readable instructions comprise instructions to generate or re-generate the one or more compute kernels based on a monitoring of an execution of the computer program in a sandboxed environment or by the two or more XPUs.

7. The apparatus according to claim 5, wherein the one or more compute kernels are generated and/or regenerated in advance of the assignment, or wherein the one or more compute kernels are generated and/or regenerated just-in-time after the assignment.

8. The apparatus according to claim 5, wherein the machine-readable instructions comprise instructions to generate or re-generate a task graph of the computer program based on the assignment of the execution of the one or more compute kernels to the two or more XPUs, and to generate or re-generate the one or more compute kernels based on the task graph.

9. The apparatus according to claim 8, wherein the machine-readable instructions comprise instructions to generate or re-generate the task graph based on a static analysis of the computer program.

10. The apparatus according to claim 9, wherein the machine-readable instructions comprise instructions to generate or re-generate the task graph based on a dynamic analysis of the computer program based on a real-world current data flow and/or a real-world past data flow.

11. The apparatus according to claim 1, wherein the machine-readable instructions comprise instructions to determine the energy-related metric by estimating the energy-related metric.

12. The apparatus according to claim 1, wherein the machine-readable instructions comprise instructions to generate synthetic data to be used by the computer program, and to determine the energy-related metric based on the synthetic data.

13. The apparatus according to claim 1, wherein the machine-readable instructions comprise instructions to discover the capabilities of the two or more XPUs of the computer system, and to determine the energy-related metric and/or to assign the execution based on the discovered capabilities.

14. The apparatus according to claim 13, wherein the capabilities comprise one or more of a compute capability, a memory capability, and an interconnect capability of the respective XPU.

15. The apparatus according to claim 1, wherein the two or more XPUs selected from the group consisting of a Central Processing Unit, CPU, a Graphics Processing Unit, GPU, a Field-Programmable Gate Array, FPGA, an Artificial Intelligence, AI, accelerator, and a communication processing offloading unit.

16. The apparatus according to claim 1, wherein the machine-readable instructions comprise instructions to provide a runtime environment for execution of the computer program, wherein the determination of the energy-related metric and the assignment of the execution is performed by the runtime environment.

17. The apparatus according to claim 1, wherein the assignment of the execution of the one or more compute kernels to the two or more different XPUs is limited by one or more policies related to one or more of a deprecated instruction or deprecated instruction set, a prohibited instruction or prohibited instruction set and code execution within an XPU by out-of-band fleet management.

18. The apparatus according to claim 1, wherein the energy-related metric is based on the one or more compute kernels being active and based on the one or more compute kernels being idle.

19. A method for controlling execution of a computer program by a computer system comprising two or more different Processing Units (XPUs), the method comprising:

obtaining the computer program, wherein at least a portion of the computer program is based on one or more compute kernels to be executed by the two or more different XPUs; executing the computer program in a sandboxed evaluation environment;

determining, for each XPU, an energy-related metric for executing the one or more compute kernels on the respective XPU based on the execution of the computer program in the sandboxed evaluation environment; and assigning the execution of the one or more compute kernels to the two or more different XPUs based on the respective energy-related metric, wherein the execution of the one or more compute kernels are assigned to the two or more different XPUs such that an energy-related goal is achieved, wherein the energy-related goal is defined by a service-level agreement associated with execution of the computer program, wherein the service-level agreement is based on capabilities of the two or more different XPUs, and a specification of the service-level agreement is bi-directional, wherein the service-level agreement is negotiated based on the bi-directional specification of the service-level agreement and based on the capabilities of the two or more different XPUs.

20. A non-transitory machine-readable storage medium including program code, when executed, to cause a machine to perform the method of claim 19.

* * * * *